US007011401B2

(12) United States Patent
Markey, III

(10) Patent No.: US 7,011,401 B2
(45) Date of Patent: Mar. 14, 2006

(54) UNDER-EYE ANTI-GLARE SPORT TATTOOS

(76) Inventor: Stephen A. Markey, III, 1420 Eagle Ridge Run, Bel Air, MD (US) 21014

( * ) Notice: Subject to any disclaimer, the term of this patent is extended or adjusted under 35 U.S.C. 154(b) by 29 days.

(21) Appl. No.: 10/960,798

(22) Filed: Oct. 7, 2004

(65) Prior Publication Data

US 2005/0073644 A1 Apr. 7, 2005

Related U.S. Application Data

(60) Provisional application No. 60/509,432, filed on Oct. 7, 2003.

(51) Int. Cl.
*G02C 7/10* (2006.01)

(52) U.S. Cl. ............................ 351/41; 351/44; 351/52

(58) Field of Classification Search .................. 351/41, 351/44, 51, 52
See application file for complete search history.

(56) References Cited

U.S. PATENT DOCUMENTS

| | | | | |
|---|---|---|---|---|
| 6,350,338 | B1 * | 2/2002 | Comiskey et al. | 156/230 |
| 6,372,235 | B1 * | 4/2002 | Livoreil et al. | 424/401 |
| 6,916,518 | B1 * | 7/2005 | Chen | 428/40.1 |
| 2004/0267283 | A1 * | 12/2004 | Mavor et al. | 606/116 |

* cited by examiner

*Primary Examiner*—Huy Mai
(74) *Attorney, Agent, or Firm*—Law Offices of Royal W. Craig

(57) ABSTRACT

A temporary under-eye anti-glare sport tattoo comprised of a solid dermatological composition with anti-glare properties. The composition forms a film that is deposited on a person's skin underneath the eyes and over the cheekbones by a dry transfer method. The film thus applied reduces eye glare and increases contrast sensitivity. By incorporating team or business logos, trademarks or the like, into the film, the present invention also serves as either an advertising mechanism for businesses or a mechanism to promote team spirit. The film is able to sustain a predefined shape, has adhesive properties, is water resistant, color fast, and heat resistant. The composition comprises oil, a gelling compound, dyes and a mixture of wax and carbon.

20 Claims, 1 Drawing Sheet

UNDER-EYE ANTI-GLARE SPORT TATTOOS

CROSS REFERENCE TO RELATED APPLICATIONS

The present application derives priority from U.S. Provisional Patent Application 60/509,432 for "UNDER-EYE ANTI-GLARE SPORT TATTOOS_", filed Oct. 7, 2003.

BACKGROUND OF THE INVENTION

1. Field of the Invention

The present invention relates to the composition of an under-eye anti-glare sport tattoo for protecting the eyes from reflective glare from the sun or from stadium lights. It further relates to a tattoo device for applying the anti-glare tattoo that avoids the need for wetting. The invention also serves as a platform for displaying text and/or drawings, including logos, trademarks, and other identifying matter.

2. Description of the Background

For many years athletes have strived to avoid interference from the glare of the sun and stadium lights. Some use sunglasses, while others smear black grease, which comprises a mixture of beeswax, paraffin and carbon, beneath their eyes. Both approaches have drawbacks. Sunglasses can cause optical distortion, interference, and/or obstruction. Black grease is messy, can stain clothing, and smears easily. Black grease also comes off inadvertently while toweling or drying off the face. Anti-glare stickers such as Glareblox™ stick-on strips[1] or Mueller® Eye Black Strips[2] were developed to overcome these limitations. These stickers were ideal for advertising or promoting team spirit. Unfortunately, a recent study by Brian M. DeBroff, M.D. and other researchers at the Yale School of Medicine[3] concluded that while black grease has anti-glare properties, anti-glare stickers and petroleum jelly do not. The researchers theorized that the anti-glare properties were a result of the mixture of wax and carbon in the grease. Additionally, the stickers tend to come off if they become wet from sweat or other moisture.

[1] www.glareblox.com/intro.html

[2] www.weplay.com/Mueller/No-Glare/

[3] YALE News Release of Jul. 17, 2003, entitled "Eye Black Grease More Effective at Reducing Glare and Improving Visual Contrast than Anti-Glare Stickers, Yale Researchers Find." Note that the study did not consider the antiglare properties of the compositions used in traditional water slide paper type temporary tattoos.

Similarly, U.S. Pat. No. 6,350,338 to Comiskey et al. teaches using temporary tattoos, to protect eyes from glare, as well as, to provide non-verbal communications to others during athletic contests. As with the black grease and the stickers, these traditional temporary tattoos have their drawbacks. The sponge-wetting method for applying them is cumbersome, messy and time-consuming. Traditionally, water slide paper holding the tattoo is placed into position on the athlete's face, the paper is soaked with water using a sponge or rag for 30 seconds and the paper is then slid away. The wet tattoo is left behind on the skin, although not always in its entirety. An extremely thin porous film that generally lacks in or has minimal anti-glare properties forms the resultant temporary tattoo. These tattoos are difficult to remove, requiring scrubbing with soap and water, which may injure the skin. Because of the difficulty in removing these wet applications, these temporary tattoos are not suitable for use on successive days.

Therefore, there exists a need for a solid dermatological composition for deposition as a film on a person's skin underneath the eyes and over the cheekbones. The film has a dual-purpose: (1) to protect a person's eyes from light glare, and (2) to allow for non-verbal promotional communication (advertising or promoting school spirit). The composition comprises gelling compound, oil, dyes and a mixture of wax and carbon. The resulting composition should: (1) be non-porous, homogeneous, and exhibit some elastic properties, (2) have adhesive properties such that when it comes in contact with skin it is non-migrating and removable only by washing with soap or wiping with alcohol or make-up remover, (3) be deposited on an athlete's skin by using a tattoo device that avoids the need for wetting, (4) be water resistant or water proof, (5) be opaque, relatively dark and single or multi-colored, (6) have color-fast or color transfer resistant properties such that once deposited and set the film may be touched or rubbed without transferring or smearing the color, (7) have heat resistant properties such that once deposited and set the film does not melt or loose its solid structure when exposed to temperatures up to 120 degrees Fahrenheit (8) be capable of having and sustaining a defined shape, graphic design or text, (9) be capable of having and sustaining a defined shape, drawing, or text incorporated into the film, and (10) be capable of being used on successive days without fear of injury to the skin.

SUMMARY OF THE INVENTION

Accordingly, it is the aim of the present invention to produce an under-eye anti-glare sport tattoo formed from a dermatological composition which is in a solid gelled form for decal-type application.

It is a further object of the invention that the composition be comprised of oil, a gelling compound, dyes, and a mixture of wax and carbon.

It is a further object of the invention that the composition is suitable for depositing as an anti-glare film on a person's skin underneath the eyes and over the cheekbones.

It is a further object of the invention that the anti-glare film should: (1) be non-porous, homogeneous, flexible, resilient and relatively thick, (2) have adhesive properties such that when it comes in contact with skin it is non-migrating and removable only by washing with soap or wiping with petroleum-based lotion or make-up remover, (3) be deposited on an athlete's skin by using a device that avoids the need for wetting, (4) be water resistant or water proof, (5) be opaque, relatively dark and single or multi-colored, (6) have color-fast or color transfer resistant properties such that once deposited and set the film may be touched or rubbed without transferring or smearing the color, and (7) have heat resistant properties such that once deposited and set the film does not melt or loose its solid structure when exposed to temperatures up to 120 degrees Fahrenheit.

Additional objects of the invention include, providing an anti-glare film that is capable of having and sustaining a defined shape, graphic design or text and/or having and sustaining a defined shape, design or text incorporated therein.

Lastly, it is an object of the present invention that the anti-glare film is used as either an advertising mechanism or a mechanism for promoting team spirit by including company or team logos, trademarks or other identifying matter in the pre-defined shapes or forms of the anti-glare film or in the pre-defined drawings and text incorporated into the anti-glare film.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is a dry transfer type under-eye anti-glare sport tattoo for protecting the eyes from reflective glare from the sun or from stadium lights.

Figure 1:
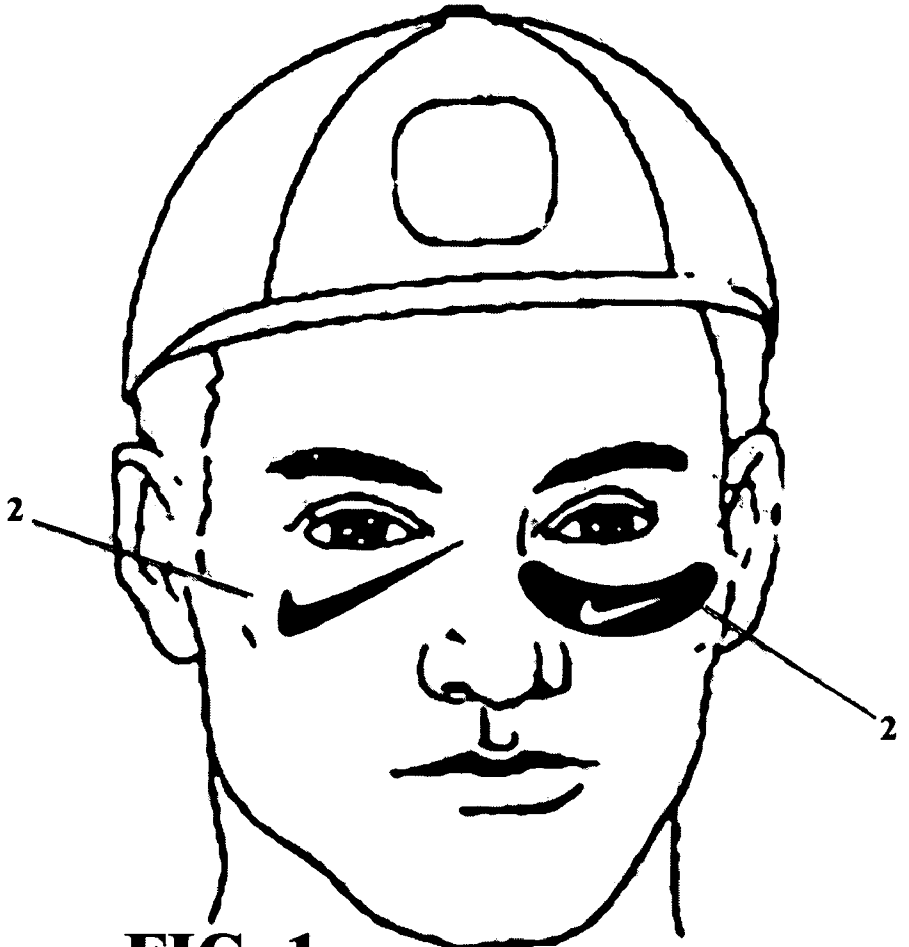
FIG. 1 illustrates the dry transfer tattoo 2 according to the present invention positioned on an individual's face and formed either in a defined shape such as the NIKE SWOOSH® or in a simple crescent shape but incorporating a trademark, shape or text, such as the NIKE SWOOSH®.

FIG. 1 illustrates the dry transfer tattoo 2 according to the present invention positioned on an individuals face and formed either in a defined shape, such as the NIKE SWOOSH® or formed in a simple crescent shape but incorporating a trademark, shape or text, such as the NIKE SWOOSH®.

In the preferred embodiment of the present invention, the tattooing material is a stable anti-glare cosmetic composition in solid form. The composition comprises a gelling formula, and a wax and carbon mixture. It is the combination of wax and carbon that gives the present composition anti-glare properties that excel when used for its intended purpose. Suitable examples of a gelling formula suitable for use in a dry transfer tattoo according to the present invention are shown in U.S. Pat. No. 6,372,235, which describes a gelling formula comprising specific hydrocarbon chains. The compounds of the gelling formulas are well known to those skilled in the art and can be prepared according to the usual processes. The gelling formula can be present in the composition in an amount which can readily be determined by a person skilled in the art as a function of the desired effect, for example in an amount ranging from 1 to 40% by weight. An amount ranging from 5 to 20 percent by weight of a wax and carbon mixture is added to give the desired consistency and coloration. The wax mixed with carbon is an important anti-glare ingredient, as it produces the matte black color which reduces glare. The size of the crystals in the wax is such that the crystals defract and/or scatter light, giving the composition containing them a more or less opaque, cloudy appearance. Therefore, wax enhances the anti-glare properties of the composition. For the purposes of the invention, the preferred waxes are those generally used in cosmetics and dermatology including any natural waxes, such as beeswax or carnauba, or manufactured waxes such as paraffin, lanolin, etc. The composition may be further colored by dyes or pigments as desired.

The composition according to the invention has the elastic behavior of a solid gel. In the absence of mechanical or thermal stimulation (such as heating over 125 degrees F.), no collapse of the composition is observed when it is outside the container containing it and when it is deposited on the skin. The elasticity of the material should withstand deformation and have a limited capacity for extension and contraction. Thus, an athlete may stretch or flex facial muscles and the tattoo will be capable of regaining its original shape after having been stretched or deformed. Moreover, the hardness of the composition according to the invention can be such that the composition is self-supporting and when pressed against the skin can form a satisfactory deposit on the skin. This hardness can range from 0.04 N to 3 N as measured using a texture analyzer, for example TA-XT2 from Rheo.

The preferred method for applying the anti-glare composition to an individual's face is by dry transfer tattoo 2, which allows instant dry application rather than a wetting process as with conventional wet-transfer tattoos.

Figure 2:
FIG. 2 depicts various examples of the dry tattoo 2 according to FIG. 1.

FIG. 2 is an exploded drawing of an array of tattoos 2 with various designs according to FIG. 1, all comprising anti-glare black matte with or without accents such as logos.

Figure 3:
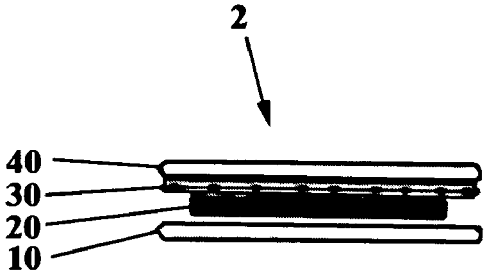
FIG. 3 is an exploded drawing of illustrating the layers of the dry tattoo 2.

FIG. 3 is a drawing illustrating the various layers of the dry tattoo 2. As shown in FIG. 3, this tattoo includes the above-described anti-glare composition as a middle layer 20 sandwiched between a layer 10 of impermeable plastic or wax coated paper for protection of the anti-glare composition, a layer 30 of temporary adhesive, and a sheet of laminated (non-stick) base paper 40 which easily detaches from the adhesive layer 30 for application of the tattoo. The composition 20, and adhesive 30 may be successively applied to the bottom layer 40 by lithographic printing. The composition layer 20 preferably comprises a defined shape (ie. a team or business logo, trademark or other identifying mark) or graphic design or text, leaving an exposed border on base paper 40. The top layer 10 is placed over the anti-glare composition layer 20 and is sealed to the portions of base paper 40.

The tattoo 2 is applied more like a decal than a temporary tattoo. The bottom layer 40 is peeled away, exposing the adhesive 30-backed anti-glare composition layer 20 and adhesive. The remaining portion, including the anti-glare composition layer 20 and adhesive layer 30, is applied under the eyes in the desired location with the anti-glare composition layer 20 away from the skin. The tattoo is temporary and removable by washing with soap or by wiping with a petroleum-based lotion or other make-up remover.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

The invention claimed is:

1. An under-eye anti-glare sport tattoo for protecting a user's eyes from reflective glare from sun or from stadium lights, comprising:

an anti-reflective composition comprising an oil, a gelling compound, a wax, and carbon; and a section of base paper, said composition being printed on said base paper for deposition onto the user's skin via dry transfer.

2. The under-eye anti-glare sport tattoo according to claim 1 wherein said gelling compound is present in an amount ranging from one to forty percent by weight.

3. The under-eye anti-glare sport tattoo according to claim 1 wherein said wax and carbon is present in said composition an amount ranging from five to twenty percent by weight.

4. The under-eye anti-glare sport tattoo according to claim 1 wherein said wax comprises crystals in the wax of a size that defract and/or scatter light.

5. The under-eye anti-glare sport tattoo according to claim 1 wherein said wax is any one from among the group of beeswax, carnauba, paraffin, or lanolin.

6. The under-eye anti-glare sport tattoo according to claim 1 wherein said composition further comprises dyes or pigments.

7. The under-eye anti-glare sport tattoo according to claim 1 wherein said composition comprises a hardness range of 0.04 N to 3 N as measured using a texture analyzer.

8. The under-eye anti-glare sport tattoo according to claim 1 wherein said composition further comprises a defined shape, graphic design or text.

9. An under-eye anti-glare sport tattoo for protecting the eyes from reflective glare from the sun or from stadium lights, comprising:

a first top layer of impermeable plastic or wax coated paper;

a second composition layer of an anti-glare composition, further comprising an oil, a gelling compound, a wax, and a carbon;

a third adhesive layer of temporary adhesive; and a fourth base layer of a sheet of laminated base paper.

10. The under-eye anti-glare sport tattoo according to claim 9 wherein said gelling compound is present in an amount ranging from one to forty percent by weight.

11. The under-eye anti-glare sport tattoo according to claim 9 wherein said wax and carbon mixture is present in an amount ranging from five to twenty percent by weight.

12. The under-eye anti-glare sport tattoo according to claim 9 wherein said wax comprises crystals in the wax of a size that defract and/or scatter light.

13. The under-eye anti-glare sport tattoo according to claim 9 wherein said wax is any one from among a group consisting of beeswax, carnauba, paraffin, or lanolin.

14. The under-eye anti-glare sport tattoo according to claim 9 wherein said composition further comprises dyes or pigments.

15. The under-eye anti-glare sport tattoo according to claim 9 wherein said composition comprises a hardness range of 0.04 N to 3 N as measured using a texture analyzer.

16. The under-eye anti-glare sport tattoo according to claim 9 wherein said second layer and said third layer are successively applied to said fourth layer by lithographic printing.

17. The under-eye anti-glare sport tattoo according to claim 9 wherein said second composition layer further comprises a defined shape, graphic design or text leaving an exposed border on said fourth base layer.

18. A method of manufacturing an under-eye anti-glare sport tattoo for protecting the eyes from reflective glare from the sun or from stadium lights, comprising the steps of:

applying a first layer of impermeable plastic or wax coated paper;

applying a second layer of an anti-glare composition, further comprising an oil, a gelling compound, a wax, and a carbon;

applying a third layer of temporary adhesive; and applying a fourth layer of a sheet of laminated base paper.

19. The method of manufacturing an under-eye anti-glare sport tattoo according to claim 18 wherein said second layer and said third layer are successively applied to said fourth layer by lithographic printing.

20. The method of manufacturing an under-eye anti-glare sport tattoo according to claim 16 wherein said step of applying said second composition layer further comprises applying said second composition layer comprising a defined shape, graphic design or text.

* * * * *